(12) United States Patent  
Orii

(10) Patent No.: US 6,912,009 B2
(45) Date of Patent: Jun. 28, 2005

(54) DATA SLICE CIRCUIT SEPARATING DATA ADDED TO A SIGNAL SUPERPOSED ON A VIDEO SIGNAL BASED ON SLICE LEVEL

(75) Inventor: Toshihiko Orii, Kanagawa (JP)

(73) Assignee: Sony Corporation (JP)

( * ) Notice: Subject to any disclaimer, the term of this patent is extended or adjusted under 35 U.S.C. 154(b) by 529 days.

(21) Appl. No.: 10/092,450

(22) Filed: Mar. 8, 2002

(65) Prior Publication Data

US 2002/0129380 A1 Sep. 12, 2002

(30) Foreign Application Priority Data

Mar. 12, 2001 (JP) ................................. P2001-069215

(51) Int. Cl.[7] .............................................. H04N 7/00
(52) U.S. Cl. ........................................ 348/465; 348/468
(58) Field of Search .................................. 348/465, 468, 348/461, 476, 478, 554

(56) References Cited

U.S. PATENT DOCUMENTS

| | | | |
|---|---|---|---|
| 4,115,811 A | | 9/1978 | Goff |
| 5,223,930 A | * | 6/1993 | Zato ........................... 348/478 |
| 5,371,545 A | | 12/1994 | Tults |
| 5,404,172 A | * | 4/1995 | Berman et al. ............. 348/465 |
| 5,463,423 A | * | 10/1995 | Tults .......................... 348/465 |
| 5,483,289 A | | 1/1996 | Urade et al. |
| 5,517,249 A | | 5/1996 | Rodriguez-Cavazos et al. |
| 5,561,469 A | * | 10/1996 | Schultz ....................... 348/476 |
| 5,589,886 A | * | 12/1996 | Ezaki .......................... 348/461 |
| 5,666,167 A | * | 9/1997 | Tults .......................... 348/465 |
| 6,285,403 B1 | | 9/2001 | Lee |

FOREIGN PATENT DOCUMENTS

| | | |
|---|---|---|
| JP | 6-253170 | 9/1994 |
| JP | 10-336609 | 12/1998 |
| WO | WO 94/07334 A | 3/1994 |

OTHER PUBLICATIONS

International Search Report dated Jun. 18, 2002.

* cited by examiner

Primary Examiner—Victor R. Kostak
(74) Attorney, Agent, or Firm—Rader, Fishman & Grauer, PLLC; Ronald P. Kananen

(57) ABSTRACT

A data slice circuit capable of generating an optimal data slice level and separating data for VBI signals of different specifications, provided with a line detection circuit for detecting any line on which a VBI signal having a CRI signal is superposed and outputting a line detection pulse only during the period and detecting any line on which a VBI signal having a reference signal is superposed and outputting another line detection pulse only during that period, a window pulse generation circuit for outputting pulses changing a period of averaging the VBI signal in accordance with the detection pulses, a data slice reference voltage detection circuit for sampling and holding an average voltage of the clamped VBI signal only while the output pulses are at a high level "H", and a data slice level generation circuit for adding a direct current voltage changed in accordance with the detection pulsed to the output voltage.

10 Claims, 9 Drawing Sheets

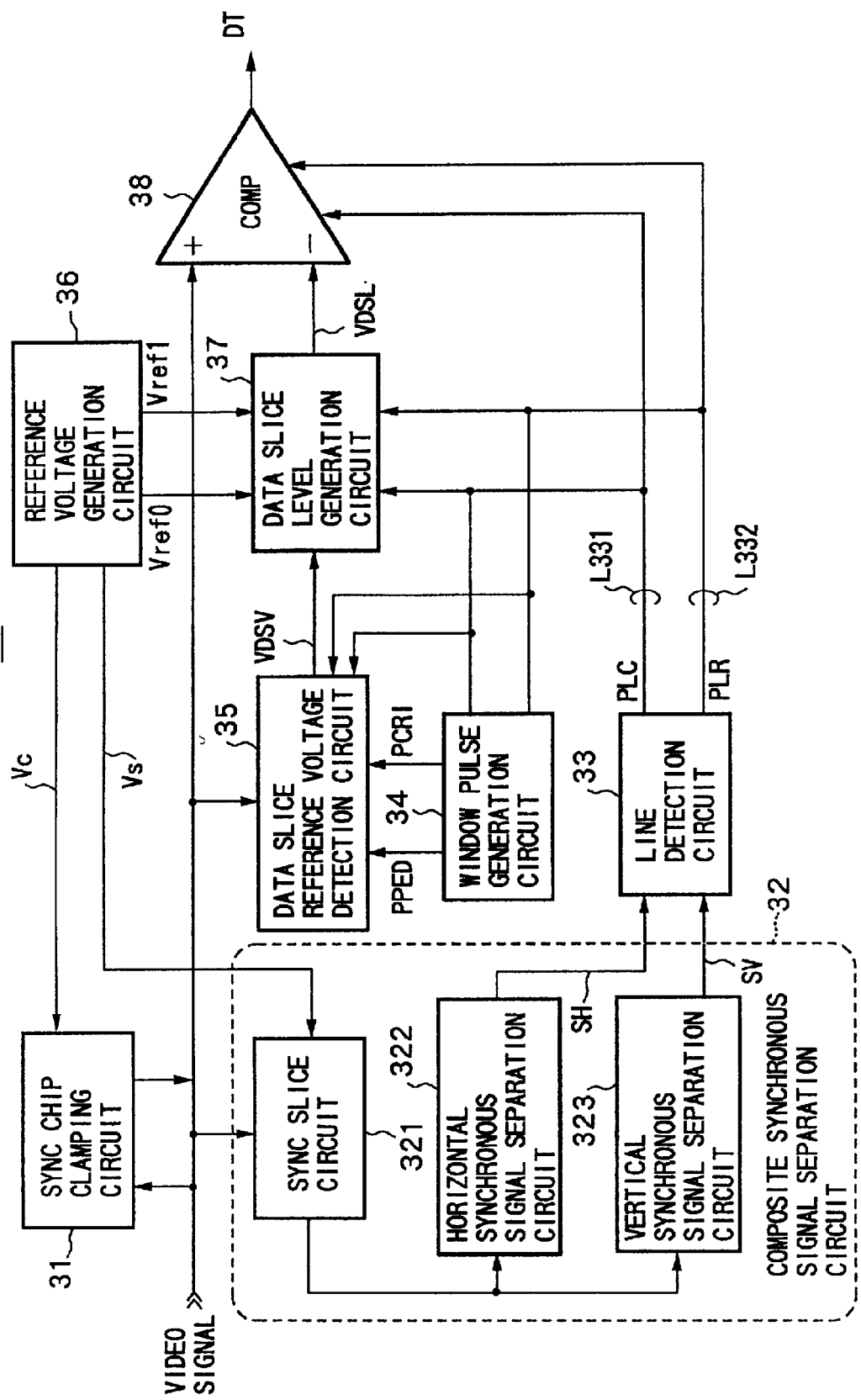

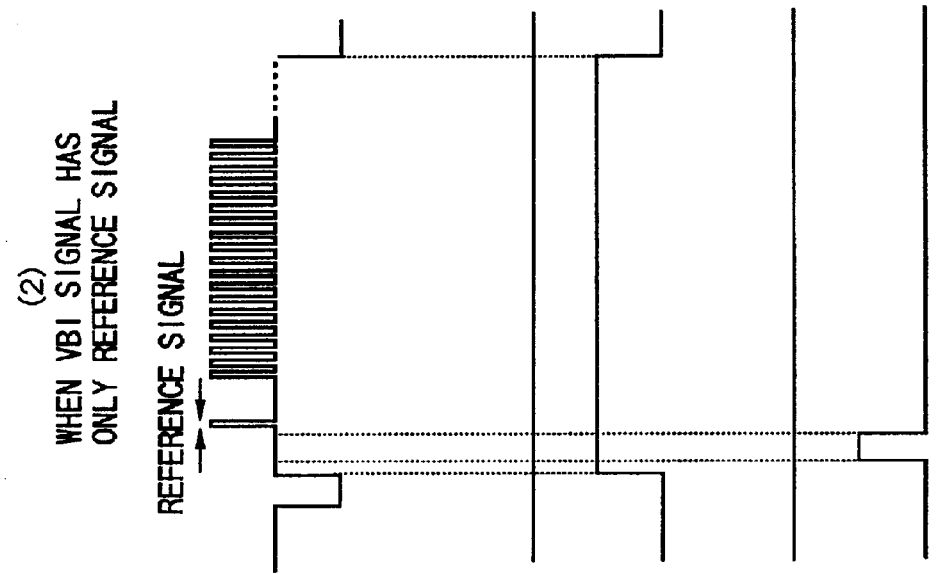
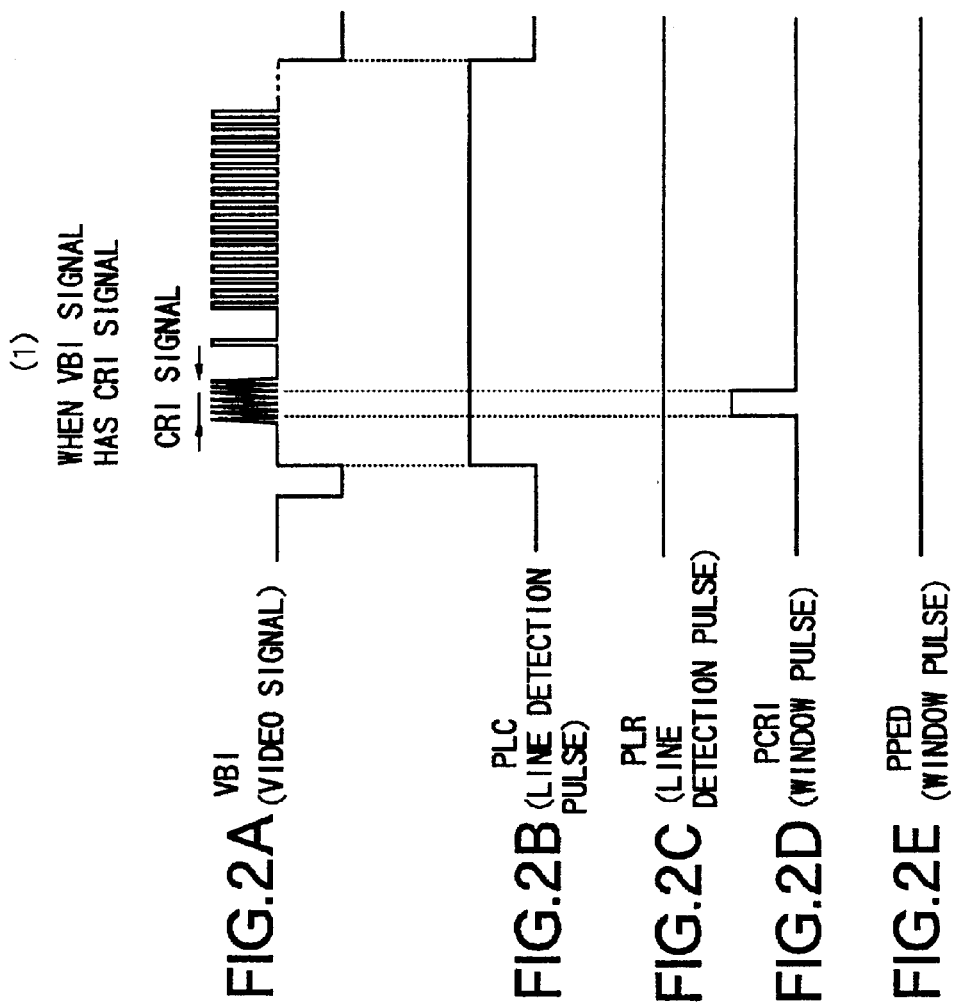

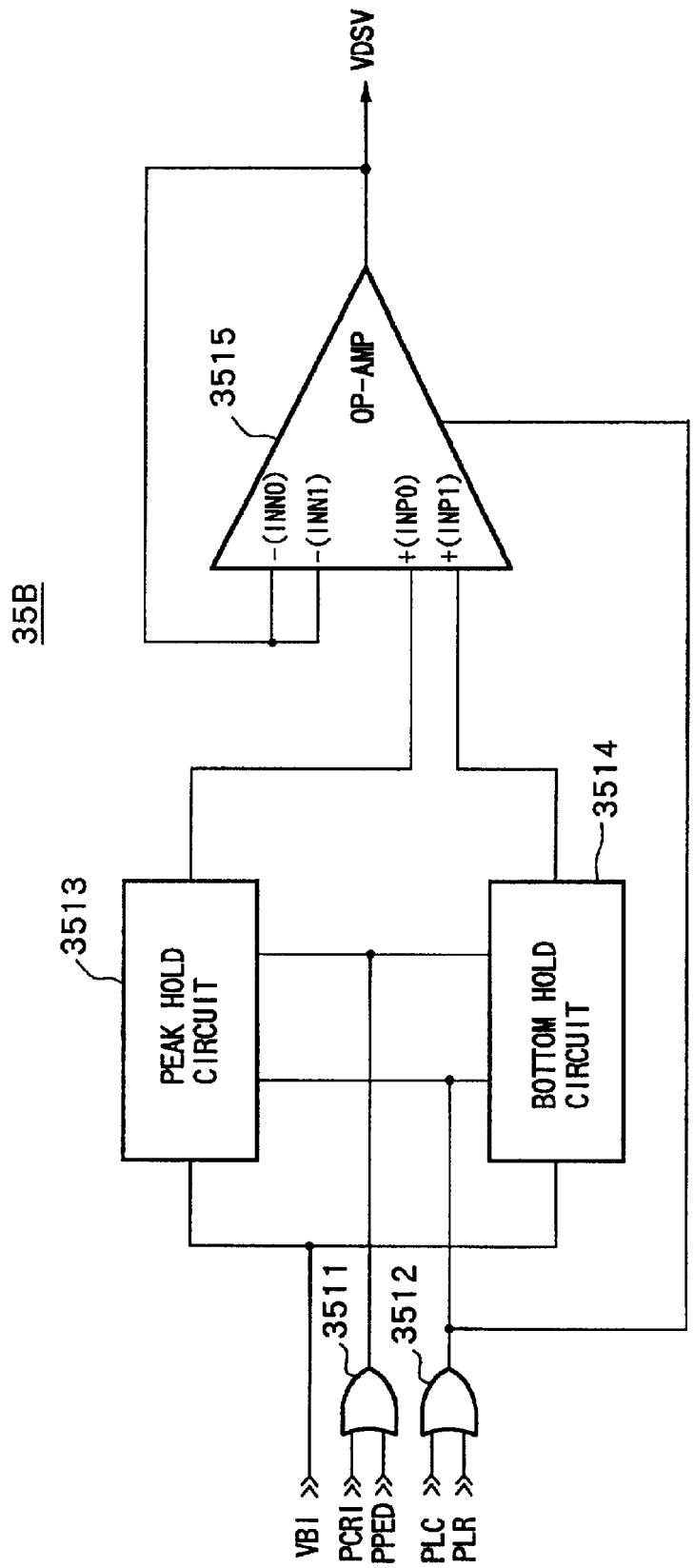

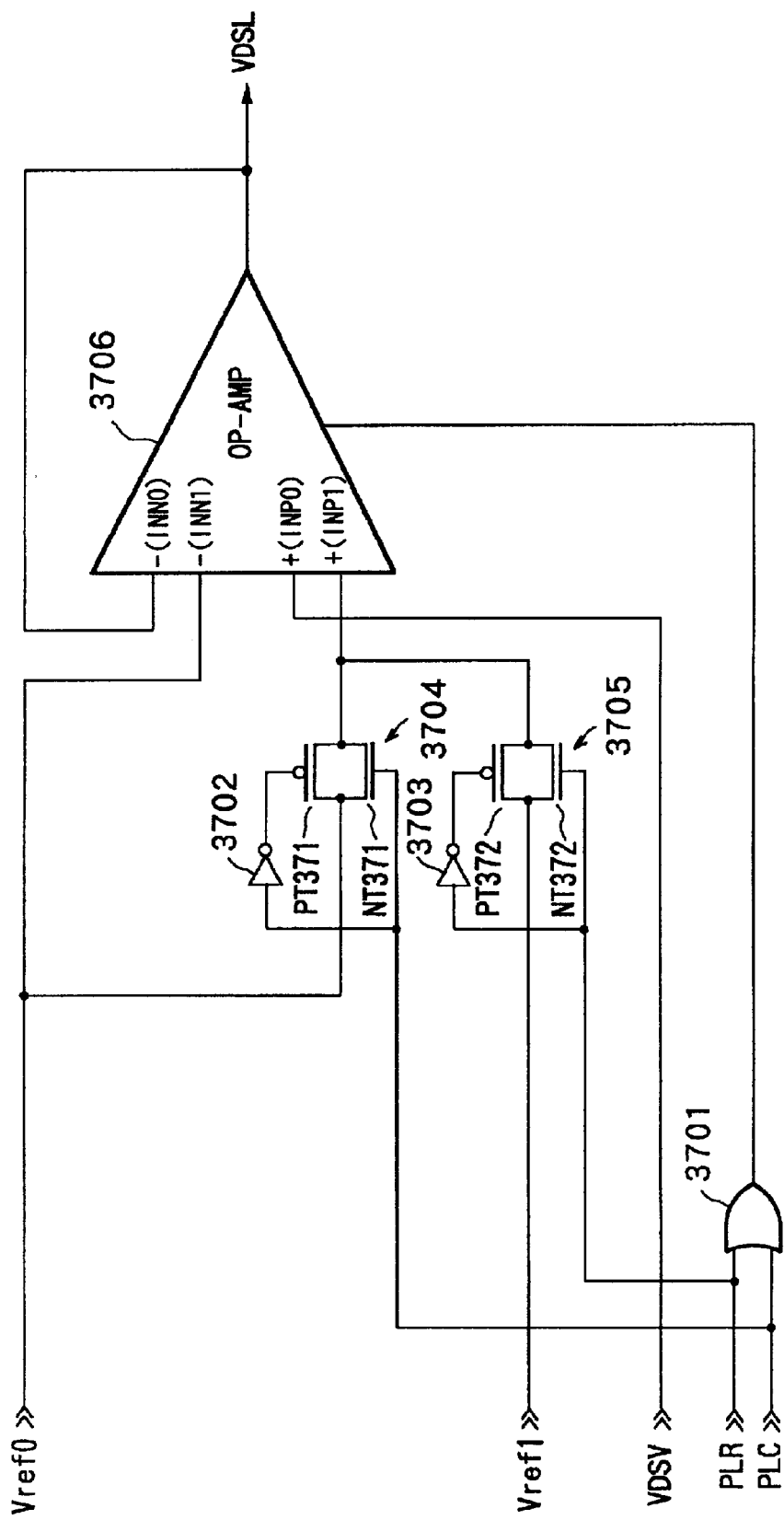
FIG.5    37A

FIG.6A VBI (VIDEO SIGNAL) 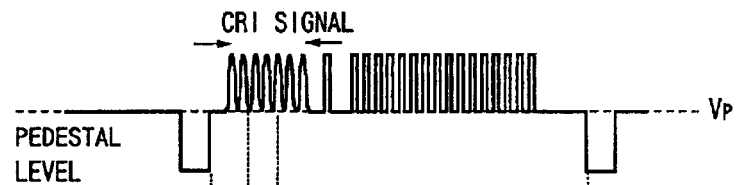
FIG.6B VDSV (DATA SLICE REFERENCE VOLTAGE) 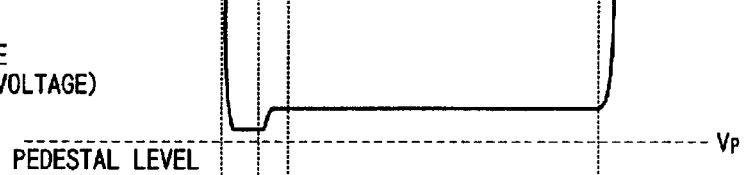
FIG.6C Vref0 (DC VOLTAGE) 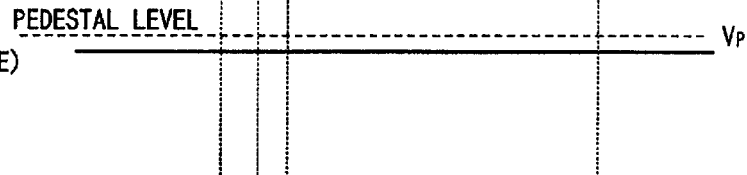
FIG.6D Vref1 (DC VOLTAGE) 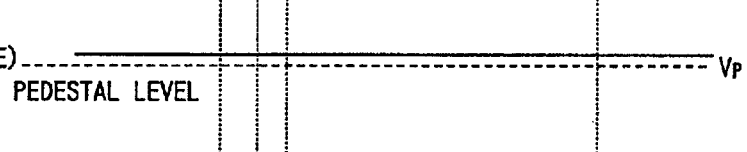
FIG.6E VDSL (DATA SLICE LEVEL) 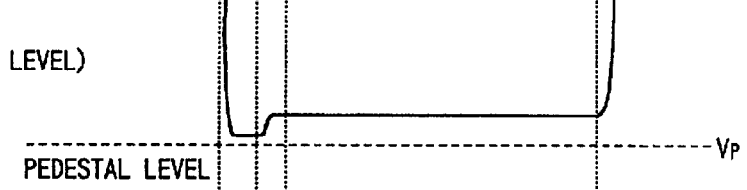
FIG.6F DT DATA SLICE CIRCUIT OUTPUT (DIGITAL OUTPUT) 
FIG.6G PLC (LINE DETECTION PULSE) 
FIG.6H PCRI (WINDOW PULSE) 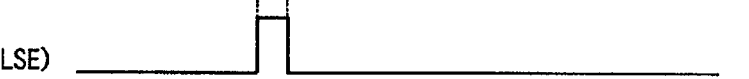

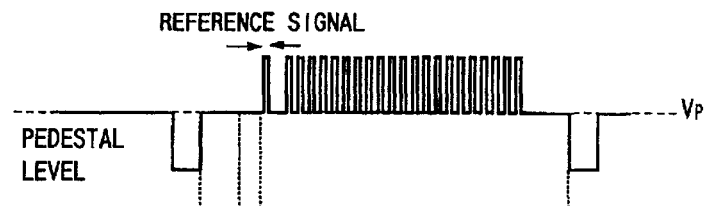
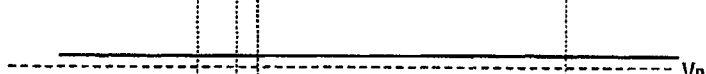
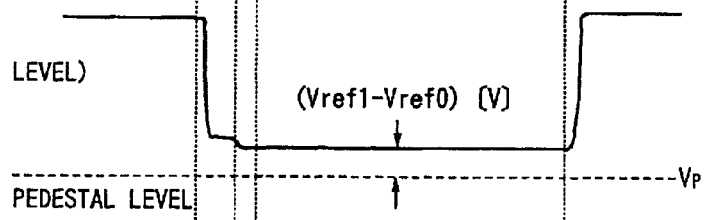
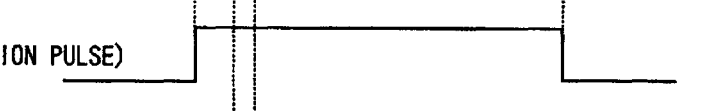

DATA SLICE CIRCUIT SEPARATING DATA ADDED TO A SIGNAL SUPERPOSED ON A VIDEO SIGNAL BASED ON SLICE LEVEL

BACKGROUND OF THE INVENTION

1. Field of the Invention

The present invention relates to a video signal processing circuit, more particularly relates to a data slice circuit for separating a variety of data superposed on an input video signal.

2. Description of the Related Art

A data slice circuit separates, digitizes, and outputs data added to (placed on) a prescribed signal superposed on a television (TV), digital television, or other video signal at the vertical blanking interval (VBI) (VBI signal), for example, a closed caption (EIA-608), ID-1 (EIAJ-CPR1204), European teletext (teletext)/VPS, or other VBI signal.

VBI signals superposed on a television, digital television, or other video signal at the vertical blanking interval can be roughly divided into ones having (including) a clock-run-in (CRI) signal such as a closed caption and teletext signal and ones only having a reference signal without having (including) a CRI signal such as an ID-1 signal.

As a data slice circuit of the related art for separating data of a VBI signal having a CRI signal, there is known for example the circuit disclosed in Japanese Unexamined Patent Publication (Kokai) No. 10-336609.

Also, as a data slice circuit of the related art for separating data of a VBI signal only having a reference signal, for example, there is known the circuit described in Japanese Unexamined Patent Publication (Kokai) No. 6-253170.

FIG. 8 is a circuit diagram of the data slice circuit of the related art for separating data of a VBI signal having a CRI signal described in Japanese Unexamined Patent Publication (Kokai) No. 10-336609.

The data slice circuit 10 comprises, as shown in FIG. 8, a top peak detector 11, a bottom peak detector 12, a sampling/holding circuit 13, a composite synchronous signal separation circuit 14, a CRI window circuit 15, a comparator 16, and resistors R11 and R12.

In the data slice circuit 10, a top peak of an input video signal, that is, VBI signal, is detected by the top peak detector 11, while a bottom peak is detected by the bottom peak detector 12.

Outputs of the top peak detector 11 and the bottom peak detector 12 which detected the top peak and the bottom peak of the input VBI signal are spliced at the resistors R11 and R12. Since the resistors R11 and R12 are set to have the same resistance values, an intermediate voltage value of the top level and the bottom level is supplied from a node P to the sampling/holding circuit 13.

Also, the CRI window circuit 14 is supplied with a composite synchronous signal CSS separated by the composite synchronous signal separation circuit 14. In the CIR window circuit 14, a control signal S15 for controlling sampling and holding operations based on the composite synchronous signal CSS is generated and output to the sampling/holding circuit 13.

In the sampling/holding circuit 13, the voltage is sampled and held in a CRI signal interval and it is output as a reference voltage (slice level) to the comparator 16 in accordance with a control signal S15 from the CRI window circuit 14.

The comparator 16 separates the data by comparing the input VBI signal with the slice level.

FIG. 9 is a circuit diagram of the data slice circuit of the related art for separating data of an VBI signal only having a reference signal described in Japanese Unexamined Patent Publication (Kokai) No. 6-253170.

The data slice circuit 20 comprises, as shown in FIG. 9, a synchronous signal clamping circuit 21, a reference voltage source 22, buffers 23 and 24, a sampling/holding (S/H) circuit 25, an operational amplifier 26, comparators 27 and 28, a clamp capacitor C21, and resistors R21 to R24.

In the data slice circuit 20, an input VBI signal is input to the synchronous signal clamping circuit 21 via the clamp capacitor C21. In the synchronous signal clamping circuit 21, a synchronous signal included in the VBI signal is clamped to a clamp level Vc supplied by the reference voltage source 22, the clamped VBI signal is supplied as a signal to be sliced to the comparators 27 and 28, and it is supplied to the sampling/holding circuit 25 via the buffer 23.

In the sampling/holding circuit 25, the clamped VBI signal is sampled and held by a pedestal level, the pedestal level Vp is detected, and the same is supplied to the operational amplifier 26 via the buffer 24 for computing the slice level in the comparators 27 and 28.

Also, the potential difference of the detected pedestal level Vp and the clamp level Vc is spliced at the resistors R21 and R22. The splice level Vs1 is supplied to the comparator 27. As a result, in the comparator 27, the processing for separating a synchronous signal is performed.

In the operational amplifier 26, the detected pedestal level Vp is input to a non-inverted input terminal (+) and the clamp level Vc is supplied to an inverted input terminal (−) via the resistor R23. Then, in the operational amplifier 26, a slice level Vs2 is generated based on the pedestal level Vp, clamping level Vc, a resistance value of the resistor R222, and a resistance value of a feedback resistor R24 as a slice level of the comparator 28 and this is output to the comparator 28. As a result, in the comparator 28, the processing for slicing data superposed on the input VBI signal at the vertical blanking interval etc. is performed.

Summarizing the problems to be solved by the invention, as explained above, the circuit in FIG. 8 separates data by the comparator 16 from an intermediate voltage value obtained by dividing the outputs of the top peak detection circuit 11 and the bottom peak detection circuit 12 for detecting a top peak and a bottom peak of an input VBI signal by the resistors R11 and R12 using an output pulse (control signal) of the CRI window circuit 15 and using as a reference voltage (slice level) a voltage sampled and held by the sampling/holding circuit 13 in the CRI signal interval.

Accordingly, the circuit in FIG. 8 is suitable for separating data from a VBI signal having a CRI signal, but cannot generate the slice level well for a VBI signal having only a reference signal and cannot separate a reference signal well by the comparator 16.

Also, the circuit in FIG. 9 detects the pedestal level Vp of the input VBI signal in the sampling/holding circuit 25, sets the relative slice levels Vs1 and Vs2 based on a sync chip level Vc and the pedestal level Vp, and performs synchronizing separation and data slicing in the comparators 27 and 28 by using the slice levels Vs1 and Vs2.

Accordingly, since the circuit in FIG. 9 generates a slice level regardless of the data portion of the VBI signal, it is suitable for separating data of a VBI signal having only a reference signal but is not optimal for separating from a VBI signal having a CRI signal.

SUMMARY OF THE INVENTION

An object of the present invention is to provide a data slice circuit capable of generating an optimal data slice level for a VBI signal etc. having a variety of standards and reliably separating and/or digitizing data.

To attain the above object, according to a first aspect of the present invention, there is provided a data slice circuit for separating data added to a prescribed signal of predetermined specifications superposed on a video signal based on a slice level, comprising a composite synchronous signal separation circuit for separating a composite synchronous signal from a video signal; a line detection circuit for detecting a line on which a desired prescribed signal is superposed from the composite synchronous signal separation circuit and outputting a line detection pulse only during a period of the detected line; a window pulse generation circuit for receiving the line detection pulse of the line detection circuit, outputting a pulse during a period for averaging the prescribed signal superposed on the detected line and changing a period for generating the pulse by the specifications of the superposed prescribed signal; a data slice reference voltage detection circuit for sampling and holding an average voltage of the prescribed signal only during a period of the pulse output by the window pulse generation circuit and detecting a data slice reference voltage; and a data slice level generation circuit for generating the slice level by adding a DC voltage to an output voltage of the data slice reference voltage detection circuit and changing the DC voltage to be added in accordance with the line detected by the line detection circuit.

According to a second aspect of the present invention, there is provided a data slice circuit for separating data added to a prescribed signal of predetermined specifications superposed on a video signal based on a slice level, comprising a sync chip clamping circuit for performing sync chip clamping on a video signal; a composite synchronous signal separation circuit for separating a composite synchronous signal from a video signal; a line detection circuit for detecting a line on which a desired prescribed signal is superposed from the composite synchronous signal separation circuit and outputting a line detection pulse only during a period of the detected line; a window pulse generation circuit for receiving the line detection pulse of the line detection circuit, outputting a pulse during a period for averaging the prescribed signal superposed on the detected line, and changing a period for generating the pulse by the specifications of the superposed prescribed signal; a data slice reference voltage detection circuit for sampling and holding an average voltage of the prescribed signal clamped at the sync chip clamping circuit only during a period of the pulse output by the window pulse generation circuit and detecting a data slice reference voltage; and a data slice level generation circuit for generating the slice level by adding a DC voltage to an output voltage of the data slice reference voltage detection circuit and changing the DC voltage to be added in accordance with the line detected by the line detection circuit.

In the present invention, the prescribed signal is superposed on a video signal at the vertical blanking interval. The window pulse generation circuit generates a pulse becoming active during a period of a CRI signal when the prescribed signal includes the CRI signal and generates a pulse becoming active during a back porch immediately after a rise of a composite synchronous signal when a CRI signal is not included and only a reference signal is included.

Also, in the present invention, the data slice reference voltage generation circuit outputs an average voltage value of a CRI signal when the prescribed signal includes a CRI signal and outputs a voltage value at a pedestal level when the CRI signal is not included and only a reference signal is included.

Furthermore, in the present invention, the data slice level generation circuit is supplied with a first direct current voltage which is lower than the pedestal level and a second direct current voltage which is higher than the pedestal level, outputs an output voltage of the data slice reference voltage detection circuit as it is as a data slice level when the prescribed signal includes a CRI signal, and generates as a data slice level the output voltage at a level added with a voltage in accordance with a difference of the second direct current voltage and the first direct current voltage as a data slice level when the CRI signal is not included and only a reference signal is included.

According to the present invention, for example, the data slice level generation circuit is supplied with a first direct current voltage Vref0 which is lower than a pedestal level and a second direct current voltage Vref1 which is higher than the pedestal level.

When the prescribed signal has a CRI signal, the sync chip clamping circuit performs sync chip clamp processing on the input prescribed signal and outputs the result to, for example, the composite synchronous signal separation circuit and the data slice reference voltage detection circuit.

The composite synchronous signal separation circuit separates the composite synchronous signal and outputs it to the line detection circuit.

The line detection circuit detects (or recognizes) a line wherein a prescribed signal having a desired CRI signal is superposed based on the output synchronous signal of the composite synchronous signal separation circuit and generates a line detection pulse and outputs it to the window generation circuit only during the period of the detected line.

The window pulse generation circuit generates a window pulse changing the period for averaging the prescribed signal superposed on the line in accordance with the line detection pulse output from the line detection circuit and outputs it to the data slice reference voltage detection circuit.

The data slice reference voltage detection circuit samples and holds an average voltage of the prescribed signal clamped at the sync chip clamping circuit only during a period where the window pulse output from the window pulse generation circuit is active and outputs it as a data slice reference voltage to the data slice level generation circuit.

The data slice level generation circuit receives the first DC voltage Vref0 and the second DC voltage Vref1 supplied, adds a DC voltage changed in accordance with the line detection pulse output from the line detection circuit to the data slice reference voltage output from the data slice reference voltage detection circuit, and outputs the result as a data slice level.

At this time, the data slice level generation circuit adds a DC voltage "(Vref0−Vref0)=0V" to the output voltage while the line detection pulse is active. Namely, the data slice level generation circuit outputs an output voltage of the data slice reference voltage detection circuit as it is as a data slice level.

Then, the output voltage of the data slice level generation circuit and the input prescribed signal are compared, whereby data is separated from the prescribed signal and digitalized data can be obtained.

Also, when the prescribed signal does not have a CRI signal and has only a reference signal, the line detection circuit detects (or recognizes) a line on which a prescribed signal having a desired reference signal is superposed based on the output synchronous signal of the composite synchronous signal separation circuit and generates a line detection pulse and outputs it to the window pulse generation circuit only during a period of the detected line.

The window pulse generation circuit generates a window pulse changing a period for averaging the prescribed signal to be superposed on the line in accordance with the line detection pulse output from the line detection circuit and outputs it to the data slice reference voltage detection circuit.

The data slice reference voltage detection circuit samples and holds an average voltage of the prescribed signal clamped at the sync chip clamping circuit only while the window pulse output from the window pulse generation circuit is active and outputs it as a data slice reference voltage to the data slice level generation circuit.

The data slice reference voltage detection circuit outputs a voltage value at a pedestal level as a data slice reference voltage when a prescribed signal to be sampled has only a reference signal.

The data slice level generation circuit receives the supplied first DC voltage Vref0 and second DC voltage Vref1, adds a DC voltage changed in accordance with the line detection pulse output from the line detection circuit to the data slice reference voltage output from the data slice reference voltage detection circuit, and outputs the result as a data slice level.

At this time, in the data slice level generation circuit adds a DC voltage "(Vref1−Vref0)" to the output voltage while the line detection pulse is active. Namely, the data slice level generation circuit outputs an output voltage of the data slice reference voltage detection circuit as it is as a data slice level.

Then, the output voltage of the data slice level generation circuit and the input prescribed signal are compared, whereby data is separated from the prescribed signal and digitalized data can be obtained.

As explained above, by making a period for sampling the average voltage value of the signal variable in accordance with the specifications of a prescribed signal for which data slicing is desired and making a DC voltage value to be added to the sampled average voltage variable, an optimal data slice level can be generated by an optimal method and data can be separated from almost all prescribed signals having different specifications.

BRIEF DESCRIPTION OF THE DRAWINGS

These and other objects and features of the present invention will become clearer from the following description of the preferred embodiments given with reference to the accompanying drawings, in which:

FIG. 1 is a block diagram of an embodiment of a data slice circuit according to the present invention;

FIGS. 2A to 2E are views of output waveforms of a line detection circuit and a window pulse generation circuit according to the present invention;

FIG. 4 is a circuit diagram of another example of the specific configuration of a data slice reference voltage detection circuit according to the present invention;

FIG. 5 is a circuit diagram of an example of the specific configuration of a data slice level generation circuit according to the present invention;

FIGS. 6A to 6H are views of output waveforms of components of the circuit in FIG. 1 in the case where a VBI signal has a CRI signal;

FIGS. 7A to 7H are views of output waveforms of components of the circuit in FIG. 1 in the case where a VBI signal does not have a CRI signal;

DESCRIPTION OF THE PREFERRED EMBODIMENTS

Figure 3:
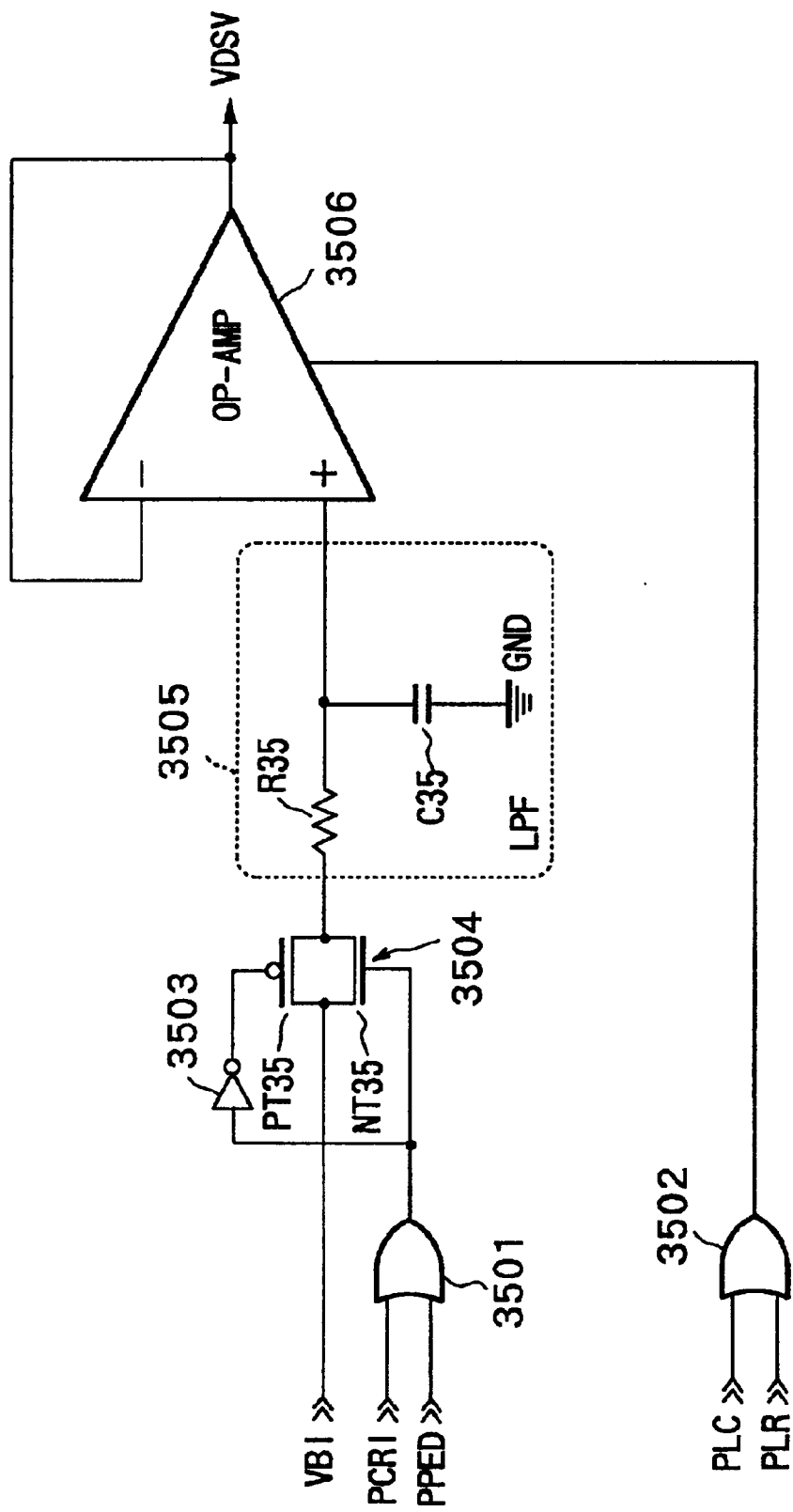
FIG. 3 is a circuit diagram of an example of the specific configuration of a data slice reference voltage detection circuit according to the present invention.
Figure 8:
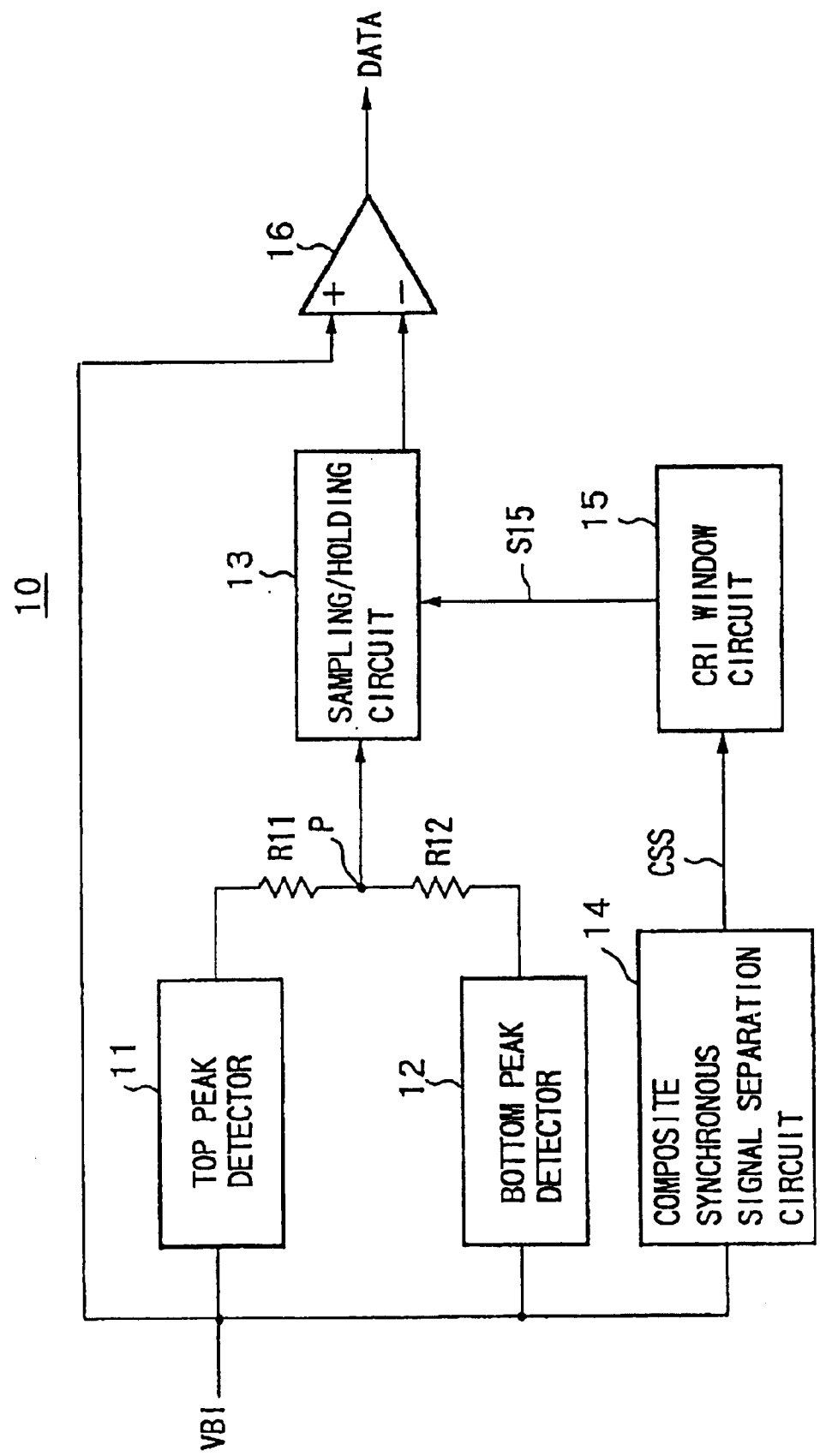
FIG. 8 is a circuit diagram of a data slice circuit of the related art for separating data of a VBI signal having a CRI signal.
Figure 9:
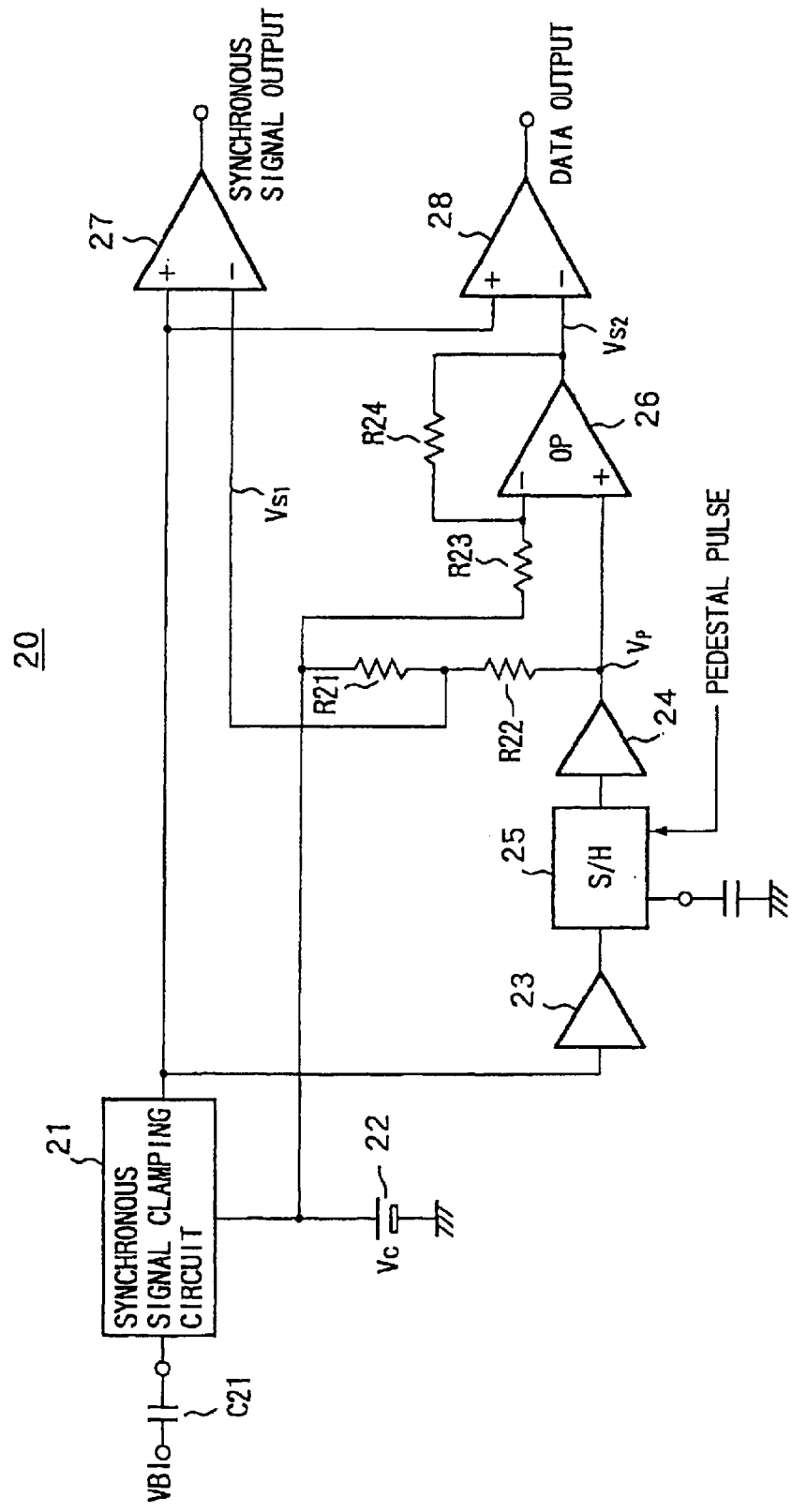
FIG. 9 is a circuit diagram of a data slice circuit of the related art for separating data of a VBI signal having only a reference signal.

Below, preferred embodiments will be described with reference to the accompanying drawings.

FIG. 1 is a block diagram of an embodiment of a data slice circuit according to the present invention.

The present data slice circuit 30, as shown in FIG. 1, comprises a sync chip clamping circuit 31, a composite synchronous signal separation circuit 32, a line detection circuit 33, a window pulse generation circuit 34, a data slice reference voltage detection circuit 35, a reference voltage generation circuit 36, a data slice level generation circuit 37, and a comparator 38.

The sync chip clamping circuit 31 performs sync chip clamping on a video signal input with the direct current (DC) component cut by for example a not shown capacitor, that is, a VBI signal, based on a reference voltage Vc generated in the reference voltage generation circuit 36 and outputs the result to the composite synchronous signal separation circuit 32, data slice reference voltage detection circuit 35, and comparator 38.

The composite synchronous signal separation circuit 32 comprises a sync slice circuit 321 for separating a composite synchronous signal from an input VBI signal based on a reference voltage (slice level) Vs generated in the reference voltage generation circuit 36, a horizontal synchronous signal separation circuit 322 for separating a horizontal synchronous signal SH from a separated synchronous signal separated in the sync slice circuit 321 and outputting it to the line detection circuit 33, and a vertical synchronous signal separation circuit 323 for separating a vertical synchronous signal SV from the separated synchronous signal separated in the sync slice circuit 321 and outputting it to the line detection circuit 33.

Based on an output of the composite synchronous signal separation circuit 32, specifically, based on the horizontal synchronous signal SH separated by the horizontal synchronous signal separation circuit 322 and the vertical synchronous signal SV separated by the vertical synchronous signal separation circuit 323, the line detection circuit 33 detects (or recognizes) any line on which a VBI signal having a desired CRI signal is superposed and generates a line detection pulse PLC signal and outputs it to the output line L331 only during a period of the detected line, while detects (or recognizes) any line on which a VBI signal having a desired reference signal is superposed and generates a line detection pulse PLR and outputs it to the output line 332.

The line detection circuit 33 supplies the generated line detection pulse PLC and the line detection pulse PLR to the window pulse generation circuit 34, data slice reference voltage detection circuit 35, and data slice level generation circuit 37.

The window pulse generation circuit 34 generates windows pulses PCRI and PPED changing a period for averaging a VBI signal superposed on the line in accordance with the line detection pulses PLC and PLR output from the line detection circuit 33 and outputs them to the data slice reference voltage detection circuit 35.

FIGS. 2A to 2E show output timings of an input VBI signal (video signal), line detection pulses PLC and PLR generated by the video signal line detection circuit 33, and window pulses PCRI and PPED generated by the window pulse generation circuit 34.

In FIG. 2A to FIG. 2E, the (1) side shows waveforms when the VBI signal has a CRI signal, while the (2) side shows waveforms when the VBI signal does not have any CRI signal but has only a reference signal.

As shown in FIG. 2A, FIG. 2B, and FIG. 2C, the line detection circuit 33 outputs line detection pulses PLC and PLR becoming a high level "H" during a period from a rise of a composite synchronous signal of a detected line until a fall of the composite synchronous signal (for example 64 $\mu$s).

The window pulse generation circuit 34, as shown in FIGS. 2A, 2B, and 2D, outputs a window pulse PCRI which becomes a high level "H" in a CRI signal interval while the line detection pulse PLC input through the output line L331 is a high level "H".

Specifically, the window pulse generation circuit 34 generates and outputs a window pulse PCRI, for example, having a 2 $\mu$s width, for example, after some $\mu$s from a rise (input) of the line detection pulse PLC input through the output line L331.

Also, the window pulse generation circuit 34, as shown in FIG. 2A, FIG. 2C, and FIG. 2E, outputs a window pulse PPED which becomes a high level "H" in a back porch immediately after a rise of a composite synchronous signal while the line detection pulse PLR input through the output line L332 is at a high level "H".

Specifically, the window pulse generation circuit 34 generates and outputs the window pulse PPED, for example, having a 1 $\mu$s width, for example, after some $\mu$s from a rise (input) of the line detection pulse PLR input through the output line L332.

The data slice reference voltage detection circuit 35 samples and holds an average voltage of a VBI signal clamped at the sync chip clamping circuit 31 and outputs the same as a data slice reference voltage VDSV to the data slice level generation circuit 37 only while the window pulse PCRI or PPED output from the window pulse generation circuit 34 is at a high level "H".

FIG. 3 is a circuit diagram of a specific example of the configuration of the data slice reference voltage detection circuit 35.

The data slice reference voltage detection circuit 35A comprises, as shown in FIG. 3, two-input OR circuits 3501 and 3502, an inverter 3503, an analog switch 3504, a low pass filter (LPF) 3505 including a resistor R35 and a capacitor C35, and an operational amplifier (OP-AMP) 3506.

The analog switch 3504 is configured by connecting sources and drains of a p-channel MOS (PMOS) transistor PT35 and an n-channel MOS (NMOS) transistor NT35.

The two input terminals of the OR circuit 3501 are connected to input lines of the window pulses PCRI and PPED, respectively, while an output terminal is connected to a gate of the NMOS transistor NT35 of the analog switch 3504 and an input terminal of the inverter 3503. An output terminal of the inverter 3503 is connected to a gate of the PMOS transistor PT35 of the analog switch 3504.

The two input terminals of the OR circuit 3502 are connected to input lines of line detection pulses PLC and PLR, while an output terminal is connected to a control terminal of the operational amplifier 3506.

One output terminal of the analog switch 3504 is connected to an input line of a VBI signal clamped at the sync chip clamping circuit 31, while another input/output terminal is connected to one end of the resistor R35 of the low pass filter 3505.

The other end of the resistor R35 is connected to one electrode of the capacitor C35 and a non-inverse input terminal (+) of the operational amplifier 3506, while the other electrode of the capacitor C35 is grounded.

Also, an inverse input terminal (−) of the operational amplifier 3506 is connected to its own output terminal.

In the data slice reference voltage detection circuit 35A configured as explained above, when the output pulse PLC or PLR of the line detection circuit 33 is at a high level "H" and the window pulse PCRI or PPED output from the window pulse generation circuit 34 is at a high level, the analog switch 3504 turns on, the clamped VBI signal is input, and only the DC component of the VBI signal is output by the low pass filter 3505.

When the output pulse PLC or PLR of the line detection circuit 33 is at a high level "H" and the window pulse PCRI or PPED is at a low level "L", the analog switch 3504 turns off and a sampled voltage value is held by the capacitor C35 and buffered by the operational amplifier 3506.

FIG. 4 is a circuit diagram of another specific example of the configuration of the data slice reference voltage detection circuit 35.

The data slice reference voltage detection circuit 35B comprises, as shown in FIG. 4, two-input OR circuits 3511 and 3512, a peak hold circuit 3513, a bottom hold circuit 3514, and a multi-input operational amplifier 3515.

The two input terminals of the OR circuit 3511 are connected to the input lines of the window pulses PCRI and PPED, respectively, while an output signal thereof is supplied to the peak hold circuit 3515 and the bottom hold circuit 3514.

The two input terminals of the OR circuit 3512 are connected to input lines of line detection pulses PLC and PLR, respectively, while an output signal thereof is supplied to the peak hold circuit 3513 and the bottom hold circuit 3514 and to the control terminal of the operational amplifier 3515.

Also, the peak hold circuit 3513 and the bottom hold circuit 3514 are supplied with a VBI signal clamped at the sync chip clamping circuit 31.

The multi-input operational amplifier 3515 comprises a first non-inverse input terminal+ (INP0) and second non-inverse input terminal+ (INP1) and a first inverse input terminal− (INN0) and second inverse input terminal− (INN1).

The first non-inverse input terminal+ (INP0) is connected to the output line of the peak hold circuit 3513, while the second non-inverse input terminal+ (INP1) is connected to the output line of the bottom hold circuit 3514.

The first inverse input terminal− (INN0) and the second inverse input terminal− (INN1) are connected to an output terminal thereof in common.

In the data slice reference voltage detection circuit 35B configured as explained above, the peak hold circuit 3513 detects the maximum voltage value of the input VBI signal and the bottom hold circuit 3514 detects the minimum voltage value of the input VBI signal while the output pulse PLC or PLR of the line detection circuit 33 is at a high level "H" and the window pulse PCRI or PPED output from the window pulse generation circuit 34 is at a high level.

While the output pulse PLC or PLR of the line detection circuit 33 is at a high level "H" and the window pulse PCRI or PPED is at a low level "L", both the peak hold circuit 3513 and the bottom hold circuit 3514 hold a sampled voltage value, and a voltage obtained by averaging the voltage values by the operational amplifier 3515 becomes a data slice level reference voltage VDSV.

As a result, the data slice reference voltage detection circuit 35 outputs an average voltage value of a CRI signal when a VBI signal to be sampled has a CRI signal, while outputs a voltage value at a pedestal level Vp when the VBI signal to be sampled has only a reference signal.

The reference voltage generation circuit 36 generates a sync chip clamp reference voltage Vc and supplies the same to the sync chip clamping circuit 31, generates a sync slice reference voltage (slice level) Vs and supplies it to the sync slice circuit 321 of the composite synchronous signal separation circuit 32, and generates a first DC voltage Vref0 and a second DC voltage Vref1 for data slicing and outputs the same to the data slice level generation circuit 37.

The data slice level generation circuit 37 sets a value of the first DC voltage Vref0 to be a value lower than a pedestal level Vp of for example 1.45V, that is, for example, 1.40V.

Also, the data slice level generation circuit 37 sets a value of the second DC voltage Vref1 to be a higher value than the pedestal level Vp of for example 1.45V, that is, for example, 1.50V.

The data slice level generation circuit 37 receives the first DC voltage Vref0 and the second DC voltage Vref1 generated by the reference voltage generation circuit 36 and adds a DC voltage changed in accordance with the line detection pulses PLC and PLR output from the line detection circuit 33 to the data slice reference voltage VDSV output from the data slice reference voltage detection circuit 35.

FIG. 5 is a circuit diagram of a specific example of the configuration of the data slice level generation circuit 37.

The data slice level generation circuit 37A comprises, as shown in FIG. 5, a two-input OR circuit 3701, inverters 3702 and 3703, analog switches 3704 and 3705, and a multi-input operational amplifier (OP-AMP) 3706.

The analog switch 3704 is configured by connecting sources and drains of a PMOS transistor PT371 and an NMOS transistor NT372.

Similarly, the analog switch 3705 is configured by connecting sources and drains of a PMOS transistor PT372 and an NMOS transistor NT372.

The multi-input operational amplifier 3706 comprises a first non-inverse input terminal+ (INP0) and second non-inverse input terminal+ (INP1) and a first inverse input terminal− (INN0) and second inverse input terminal− (INN1) and operates so that a total of voltages input to the first non-inverse input terminal+ (INP0) and the second non-inverse input terminal+ (INP1) becomes equal to a total of voltages input to the first inverse input terminal− (INN0) and the second inverse input terminal− (INN1).

The two input terminals of the OR circuit 3701 are connected to input lines of the line detection pulses PLC and PLR, respectively, while an output terminal is connected to a control terminal of the operational amplifier 3706.

An input terminal of the inverter 3702 is connected to the input line of the line detection pulse PLC, while an output terminal is connected to a gate of the PMOS transistor PT371 of the analog switch 3704. Also, a gate of the NMOS transistor NT372 of the analog switch 3704 is connected to an input line of the line detection pulse PLC.

One input/output terminal of the analog switch 3704 is connected to a supply line of a first DC voltage Vref0, while the other input/output terminal is connected to the second non-inverse input terminal+ (INP1) of the operational amplifier 3706.

An input terminal of the inverter 3703 is connected to an input line of the line detection pulse PLR, while an output terminal is connected to a gate of the PMOS transistor PT372 of the analog switch 3705. Also, a gate of the NMOS transistor NT372 of the analog switch 3705 is connected to an input line of the line detection pulse PLR.

One input/output terminal of the analog switch 3705 is connected to a supply line of a second DC voltage Vref1, while the other input/output terminal is connected to the second non-inverse input terminal+ (INP1).

Also, the first non-inverse input terminal+ (INP0) of the operational amplifier 3706 is connected to a supply line of the data slice reference voltage VDSV, the second inverse input terminal− (INN1) is connected to a supply line of the first DC voltage Vref0, and the first inverse input terminal− (INN0) is connected to its own output terminal.

The data slice level generation circuit 37A configured as above adds a DC level to the data slice reference voltage VDSV output from the data slice reference voltage detection circuit 35 by using the multi-input operational amplifier 3706 and outputs the result.

Specifically, the analog switch 3704 is turned on and a DC voltage "(Vref0−Vref0)=0V" is added to the output voltage while the line detection pulse PLC is at a high level "H".

On the other hand, the analog switch 3705 is turned on and a DC voltage "(Vref1−Vref0)" is added to the output voltage while the line detection pulse PLR is at a high level "H".

As a result, for a VBI signal having a CRI signal, the data slice level generation circuit 37 outputs a voltage value obtained by averaging the CRI signal as a data slice level VDSL to the comparator 38.

On the other hand, for a VBI signal having only a reference signal, the data slice level generation circuit 37 outputs a voltage value obtained by adding a specific DC voltage (Vref1−Vref0) to a pedestal level Vp as a data slice level VDSL.

At this time, by adding to the added DC voltage in advance a DC voltage for canceling the offset voltages of circuits such as the operational amplifier and comparator, it is possible to cancel the offset voltages of the operational amplifier, comparator, etc. and improve the accuracy of slicing data. In FIG. 5, the analog switch 3704 is connected to a supply line of the first DC voltage Vref0, but by connecting this to a supply line of the third voltage Vref2 (for example) and setting the Vref2 to the optimal level, a DC voltage for canceling the offset voltages of circuits such as the operational amplifier and comparator can be added even to a voltage value obtained by averaging a CRI signal.

The comparator 38 is supplied with a VBI signal input to a non-inverse input terminal (+), is supplied with a data slice level VDSL is input to an inverse input terminal (−), separates data from the VBI signal by comparing the output voltage VDSL of the data slice level generation circuit 37 with the input VBI signal, and outputs digitized data DT.

Next, the operation of the above configuration will be explained, separating it into a case where the VBI signal has a CRI signal and a case where the VBI signal does not have a CRI signal and has only a reference signal, with reference to the timing charts in FIG. 6A to FIG. 6H and FIG. 7A to FIG. 7H.

First, the operation when the VBI signal has a CRI signal will be explained with reference to FIG. 6A to FIG. 6H.

In the reference voltage generation circuit 36, a sync clamp reference voltage Vc is generated, and the generated voltage Vc is supplied to the sync chip clamping circuit 31, while a sync slice reference voltage (slice level) Vs is generated and the generated voltage Vs is supplied to the sync slice circuit 321 of the composite synchronous signal separation circuit 32. Also, in the reference voltage generation circuit 36, as shown in FIG. 6C and FIG. 6D, a first DC voltage Vref0 and a second DC voltage Vref1 for data slicing are generated and these are supplied to the data slice level generation circuit 37.

Then, as shown in FIG. 6A, in the sync chip clamping circuit 31, the sync chip clamping is performed on the VBI signal input with the direct (DC) component cut, for example, by a not shown capacitor based on a reference voltage Vc generated by the reference voltage generation circuit 36 and the result is output to the composite synchronous signal separation circuit 32, the data slice reference voltage detection circuit 35, and the comparator 38.

In the composite synchronous signal separation circuit 32, a composite synchronous signal is separated from the input VBI signal based on the reference voltage (slice level) Vs generated by the reference voltage generation circuit 36 and furthermore a horizontal synchronous signal SH and a vertical synchronous signal SV are separated and these are output to the line detection circuit 33.

In the line detection circuit 33, any line to which a VBI signal having a desired CRI signal is superposed is detected (or recognized) based on an output synchronous signal of the composite synchronous signal separation circuit 32, and a line detection pulse PLC as shown in FIG. 6G is generated and it is output to the output line L331 only during a period of the detected line.

The line detection pules PLC output to the output line L331 is supplied to the window pulse generation circuit 34, data slice reference voltage detection circuit 35, and data slice level generation circuit 37.

Note that, as shown in FIG. 6A and FIG. 6G, the line detection pulse PLC becomes a high level "H" during a period from a rise of the composite synchronous signal of the detected line to a fall of the composite synchronous signal where the line ends.

In the window pulse generation circuit 34, a window pulse PCRI changing a period of averaging a VBI signal superposed on a line is generated in accordance with a line detection pulse PLC output from the line detection circuit 33 and it is output to the data slice reference voltage detection circuit 35.

The window pulse PCRI becomes a high level "H" during a period of a CRI signal as shown in FIG. 6A and FIG. 6H.

In the data slice reference voltage detection circuit 35, an average voltage of the VBI signal clamped at the sync chip clamping circuit 31 is sampled and held and it is output as a data slice reference voltage VDSV to the data slice level generation circuit 37 only while the window pulse PCRI output from the window pulse generation circuit 34 is at a high level "H".

When the VBI signal sampled has a CRI signal, in the data slice reference voltage detection circuit 35, as shown in FIG. 6A and FIG. 6B, the average voltage value of the CRI signal is output as a data slice reference voltage VDSV.

In the data slice level generation circuit 37, a first DC voltage Vref0 and a second DC voltage Vref1 generated by the reference voltage generation circuit 36 are received, a DC voltage changed in accordance with a line detection pulse PLC output from the line detection circuit 33 is added to the data slice reference voltage VDSV output from the data slice reference voltage detection circuit 35, and the result is output as a data slice level VDSL to the comparator 38.

At this time, in the data slice level generation circuit 37, a DC voltage "(Vref0−Vref0)=0" is added to the output voltage while the line detection pulse PLC is at a high level "H".

Accordingly, for a VBI signal having a CRI signal, a voltage value obtained by averaging the CRI signal is output as a data slice level VDSL from the data slice level generation circuit 37 to the comparator 38.

In the comparator 38, the output voltage VDSL of the data slice level generation circuit 37 is compared with the input VBI signal, whereby data is separated from the VBI signal and digitized data DT is output.

Next, the operation for when a VBI signal does not have a CRI signal and has only a reference signal will be explained with reference to FIG. 7A to FIG. 7H.

In this case as well, in the reference voltage generation circuit 36, a sync chip clamp reference voltage Vc is generated and the generated voltage Vc is supplied to the sync chip clamping circuit 31 and a sync slice reference voltage (slice level) Vs is generated and the generated voltage Vs is supplied to the sync slice circuit 321 of the composite synchronous signal separation circuit 32. Also, in the reference voltage generation circuit 36, as shown in FIG. 7C and FIG. 7D, a first DC voltage Vref0 and a second DC voltage Vref1 for data slicing are generated and these are supplied to the data slice level generation circuit 37.

Then, as shown in FIG. 7A, in the sync chip clamping circuit 31, the sync chip clamping is performed on the VBI signal input with the direct current (DC) component cut, for example, by a not shown capacitor based on the reference voltage Vc generated by the reference voltage generation circuit 36 and the result is output to the composite synchronous signal separation circuit 32, data slice reference voltage detection circuit 35, and comparator 38.

In the composite synchronous signal separation circuit 32, a composite synchronous signal is generated from the input VBI signal based on the reference voltage (slice level) Vs generated in the reference voltage generation circuit 36 and furthermore a horizontal synchronous signal SH and a vertical synchronous signal SV are generated and these are output to the line detection circuit 33.

In the line detection circuit 33, any line on which a VBI signal having a desired reference signal is superposed is detected (or recognized) based on an output synchronous signal of the composite synchronous signal separation circuit 32, and a line detection pulse PLR as shown in FIG. 7G is generated and it is output it to the output line L332 only during a period of the detected line.

The line detection pulse PLR output to the output line L332 is supplied to the window pulse generation circuit 34, data slice reference voltage detection circuit 35, and data slice level generation circuit 37.

Note that the line detection pulse PLR, as shown in FIG. 7A and FIG. 7G, becomes a high level "H" during a period from a rise of the composite synchronous signal of the detected line until a fall of the composite synchronous signal where the line ends.

In the window pulse generation circuit 34, a window pulse PPED changing a period for averaging the VBI signal superposed on the line is generated in accordance with the line detection pulse PLR output from the line detection circuit 33 and it is output to the data slice reference voltage detection circuit 35.

The window pulse PPED becomes, as shown in FIG. 7A and FIG. 7H, a high level "H" during a period of a back porch immediately after the rise of the composite synchronous signal.

In the data slice reference voltage detection circuit 35, an average voltage of the VBI signal clamped at the sync chip clamping circuit 31 is sampled and held and it is output as a data slice reference voltage DVSV to the data slice level generation circuit 37 only while the window pulse PPED output from the window pulse generation circuit 34 is at a high level "H".

When the VBI signal sampled does not have a reference signal, in the data slice reference voltage detection circuit 35, as shown in FIG. 7A and FIG. 7B, a voltage value at a pedestal level Vp is output as a data slice reference voltage VDSV.

In the data slice level generation circuit 37, the first DC voltage Vref0 and the second DC voltage Vref1 generated by the reference voltage generation circuit 36 are received, a DC voltage changed in accordance with the line detection pulse PLR output from the line detection circuit 33 is added to the data slice reference voltage VDSV output from the data slice reference voltage detection circuit 35, and the result is output as a data slice level VDSL to the comparator 38.

At this time, in the data slice level generation circuit 37, a DC voltage "(Vref1−Vref0)" is added to the output voltage while the line detection pulse PLR is at a high level.

Accordingly, for a VBI signal having only a reference signal, a voltage value obtained by adding a specific DC voltage (Vref1−Vref0) to the pedestal level Vp is output as a data slice level VDSL from the data slice level generation circuit 37 to the comparator 38.

In the comparator 38, the output voltage VDSL of the data slice level generation circuit 37 is compared with the input VBI signal, whereby data is separated from the VBI signal and digitized data DT is output.

As explained above, according to this embodiment, since there are provided a sync chip clamping circuit 31 for performing sync chip clamping on a DC cut input video signal, a composite synchronous signal separation circuit 32 for separating a composite synchronous signal from the video signal, a line detection circuit 33 for outputting a line detection pulse PLC only during the detected line period when a line on which a VBI signal having a desired CRI signal is superposed is detected from the output of the composite synchronous signal separation circuit 32, while outputting a line detection pulse PLR only during the detected line period when a line on which a VBI signal having a desired reference signal is superposed is detected, a window pulse generation circuit 34 for outputting pulses PCRI and PPED changing a period for averaging the VBI signal superposed on the line in accordance with the output detection pulses PLC and PLR of the line detection circuit, a data slice reference voltage detection circuit 35 for sampling and holding an average voltage of the VBI signal clamped at the sync chip clamping circuit 31, a data slice level generation circuit 37 for adding a DC voltage changed in accordance with the line detection pulses PLC and PLR to the output voltage of the data slice reference voltage detection circuit 35, and a comparator 38 for separating data from the VBI signal by comparing the output voltage of the data slice level generation circuit 37 with the input VBI signal and outputting digitized data, there are the advantages that the most suitable data slice level is generated by the most suitable method and data can be separated from almost all VBI signals having different specifications by making the period of sampling the average voltage value of a signal variable and making the DC value to be added to the sampled average voltage variable in accordance with the specifications of the VBI signal for which data slicing is desired.

Namely, since the most suitable data slice level can be generated by the most suitable method and separation and digitalization of data are possible for both a VBI signal having a CRI signal and a VB signal only having a reference signal, data can be accurately sliced from VBI signals of almost all specifications by just the data slice circuit according to the present invention.

Also, since the slice level is generated by adding a DC voltage to a reference DC voltage of a slice level detected from the VBI signal, offset voltages of circuits like the operational amplifier and comparator can be canceled by adding a DC voltage to cancel the offset voltages of the operational amplifier and comparator etc. to the DC voltage value added. As a result, not only can data be separated at a high accuracy, but also the defect rate of ICs caused by offset of circuits can be reduced.

As explained above, by making the period of sampling the average voltage value of a signal variable and also making a DC voltage value added to the sampled average voltage variable in accordance with the specifications of a VBI signal for which data slicing is desired, it is possible to generate the most suitable data slice level and to separate data for a plurality of VBI signals having different specifications.

Note that in the data slice level generation circuit, the same effects can be seen even by replacing it with a circuit for multiplying the voltage value of the difference of the sync chip level and the sampled average voltage value and making the factor multipled with variable in accordance with the detected line.

Summarizing the effects of the invention, as explained above, according to the present invention, the most suitable data slice level can be generated by the most suitable method and data can be separated and digitized from VBI signals of different specifications.

Accordingly, data can be sliced from VBI signals of almost all specifications at a high accuracy by just the data slice circuit according to the present invention.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A data slice circuit for separating data added to a prescribed signal of predetermined specifications superposed on a video signal based on a slice level, comprising:
   a composite synchronous signal separation circuit for separating a composite synchronous signal from a video signal;

a line detection circuit for detecting a line on which a desired prescribed signal is superposed from the composite synchronous signal separation circuit and outputting a line detection pulse only during a period of the detected line;

a window pulse generation circuit for receiving the line detection pulse of the line detection circuit, outputting a pulse during a period for averaging the prescribed signal superposed on the detected line and changing a period for generating the pulse by the specifications of the superposed prescribed signal;

a data slice reference voltage detection circuit for sampling and holding an average voltage of the prescribed signal only during a period of the pulse output by the window pulse generation circuit and detecting a data slice reference voltage; and a data slice level generation circuit for generating the slice level by adding a direct current voltage to an output voltage of the data slice reference voltage detection circuit and changing the direct current voltage to be added in accordance with the line detected by the line detection circuit.

2. A data slice circuit for separating data added to a prescribed signal of predetermined specifications superposed on a video signal based on a slice level, comprising:

a composite synchronous signal separation circuit for separating a composite synchronous signal from a video signal;

a line detection circuit for detecting a line on which a desired prescribed signal is superposed from the composite synchronous signal separation circuit and outputting a line detection pulse only during a period of the detected line;

a window pulse generation circuit for receiving the line detection pulse of the line detection circuit, outputting a pulse during a period for averaging the prescribed signal superposed on the detected line and changing a period for generating the pulse by the specifications of the superposed prescribed signal;

a data slice reference voltage detection circuit for sampling and holding an average voltage of the prescribed signal only during a period of the pulse output by the window pulse generation circuit and detecting a data slice reference voltage; and a data slice level generation circuit for generating the slice level by adding a direct current voltage to an output voltage of the data slice reference voltage detection circuit and changing the direct current voltage to be added in accordance with the line detected by the line detection circuit; wherein:

said prescribed signal is superposed on a video signal at a vertical blanking interval; and said window pulse generation circuit generates a pulse becoming active during a period of a CRI signal when said prescribed signal includes a CRI signal and generates a pulse becoming active during a back porch immediately after a rise of a composite synchronous signal when a CRI signal is not included and only a reference signal is included.

3. A data slice circuit as set forth in claim 2, wherein said data slice reference voltage generation circuit outputs an average voltage value of a CRI signal when said prescribed signal includes a CRI signal and outputs a voltage value at a pedestal level when the CRI signal is not included and only a reference signal is included.

4. A data slice circuit as set forth in claim 2, wherein said data slice level generation circuit is supplied with a first direct current voltage which is lower than the pedestal level and a second direct current voltage which is higher than the pedestal level, outputs an output voltage of said data slice reference voltage detection circuit as it is as a data slice level when said prescribed signal includes a CRI signal, and generates as a data slice level the output voltage at a level added with a voltage in accordance with a difference of said second direct current voltage and the first direct current voltage as a data slice level when the CRI signal is not included and only a reference signal is included.

5. A data slice circuit as set forth in claim 3, wherein said data slice level generation circuit is supplied with a first direct current voltage which is lower than the pedestal level and a second direct current voltage which is higher than the pedestal level, outputs an output voltage of said data slice reference voltage detection circuit as it is as a data slice level when said prescribed signal includes a CRI signal, and generates as a data slice level the output voltage at a level added with a voltage in accordance with a difference of said second direct current voltage and the first direct current voltage as a data slice level when the CRI signal is not included and only a reference signal is included.

6. A data slice circuit for separating data added to a prescribed signal of predetermined specifications superposed on a video signal based on a slice level, comprising:

a sync chip clamping circuit for performing sync chip clamping on a video signal;

a composite synchronous signal separation circuit for separating a composite synchronous signal from a video signal;

a line detection circuit for detecting a line on which a desired prescribed signal is superposed from the composite synchronous signal separation circuit and outputting a line detection pulse only during a period of the detected line;

a window pulse generation circuit for receiving the line detection pulse of the line detection circuit, outputting a pulse during a period for averaging the prescribed signal superposed on the detected line, and changing a period for generating the pulse by the specifications of the superposed prescribed signal;

a data slice reference voltage detection circuit for sampling and holding an average voltage of the prescribed signal clamped at the sync chip clamping circuit only during a period of the pulse output by the window pulse generation circuit and detecting a data slice reference voltage; and a data slice level generation circuit for generating the slice level by adding a direct current voltage to an output voltage of the data slice reference voltage detection circuit and changing the direct current voltage to be added in accordance with the line detected by the line detection circuit.

7. A data slice circuit for separating data added to a prescribed signal of predetermined specifications superposed on a video signal based on a slice level, comprising:

a sync chip clamping circuit for performing sync chip clamping on a video signal;

a composite synchronous signal separation circuit for separating a composite synchronous signal from a video signal;

a line detection circuit for detecting a line on which a desired prescribed signal is superposed from the composite synchronous signal separation circuit and outputting a line detection pulse only during a period of the detected line;

a window pulse generation circuit for receiving the line detection pulse of the line detection circuit, outputting a pulse during a period for averaging the prescribed signal superposed on the detected line, and changing a period for generating the pulse by the specifications of the superposed prescribed signal;

a data slice reference voltage detection circuit for sampling and holding an average voltage of the prescribed signal clamped at the sync chip clamping circuit only during a period of the pulse output by the window pulse generation circuit and detecting a data slice reference voltage; and a data slice level generation circuit for generating the slice level by adding a direct current voltage to an output voltage of the data slice reference voltage detection circuit and changing the direct current voltage to be added in accordance with the line detected by the line detection circuit; wherein:

said prescribed signal is superposed on a video signal at a vertical blanking interval; and said window pulse generation circuit generates a pulse becoming active during a period of a CRI signal when said prescribed signal includes a CRI signal and generates a pulse becoming active during a back porch immediately after a rise of a composite synchronous signal when a CRI signal is not included and only a reference signal is included.

8. A data slice circuit as set forth in claim 7, wherein said data slice reference voltage generation circuit outputs an average voltage value of a CRI signal when said prescribed signal includes a CRI signal and outputs a voltage value at a pedestal level when the CRI signal is not included and only a reference signal is included.

9. A data slice circuit as set forth in claim 7, wherein said data slice level generation circuit is supplied with a first direct current voltage which is lower than the pedestal level and a second direct current voltage which is higher than the pedestal level, outputs an output voltage of said data slice reference voltage detection circuit as it is as a data slice level when said prescribed signal includes a CRI signal, and generates as a data slice level the output voltage at a level added with a voltage in accordance with a difference of said second direct current voltage and the first direct current voltage as a data slice level when the CRI signal is not included and only a reference signal is included.

10. A data slice circuit as set forth in claim 8, wherein said data slice level generation circuit is supplied with a first direct current voltage which is lower than the pedestal level and a second direct current voltage which is higher than the pedestal level, outputs an output voltage of said data slice reference voltage detection circuit as it is as a data slice level when said prescribed signal includes a CRI signal, and generates as a data slice level the output voltage at a level added with a voltage in accordance with a difference of said second direct current voltage and the first direct current voltage as a data slice level when the CRI signal is not included and only a reference signal is included.

* * * * *